3,027,251
METHOD OF PROCESSING SULPHIDIC CONCENTRATES
Bruno Schaefer, Koln (Rhine), Rudolf Michels and Kurt Meyer, Frankfurt am Main, and Hans Rausch, Oberursel (Taunus), Germany, assignors to Metallgesellschaft Aktiengesellschaft, Frankfurt am Main, Germany
No Drawing. Filed Dec. 17, 1959, Ser. No. 860,076
Claims priority, application Germany Dec. 23, 1958
7 Claims. (Cl. 75—3)

This invention relates to a method for producing weather resistant pellets of metallurgical materials and, in particular, is directed to the processing of sulphidic concentrates into water resistant pellets.

It is known to mix bentonite to flotation pyrite ores before forming the mixture into green pellets of 0.5 to 5 mm. diameter and then to roast and heat harden the pellets. Green pellets thus made of flotation pyrites with the addition of bentonite exhibit considerable stability when they are dry, and they can sustain the subsequent roasting process without suffering any significant degree of disintegration. However, it has been found that the dried green pellets lose their stability as soon as they become moist. Such pellets cannot therefore be kept in the open, because they will then easily disintegrate and give rise to the same kind of difficulties that are experienced in the processing of an untreated raw material.

The object of the present invention is to produce pellets of metallurgical materials which are resistant to disintegration under humid storage conditions.

It has been found in this invention that stable weather-resistant green pellets of sulphidic concentrates or other fine-grained ore materials, such as flotation pyrites, flotated zinc blend, flotated antimony sulphides, platinum concentrates, and the like, can be obtained by adding finely ground elemental sulphur or finely ground substances containing elemental sulphur to these materials in relatively small quantities and by heating the pellets, after they have been dried, to temperatures above the melting point of the sulphur, for example from 120 to 130° C., and thereafter cooling them. An addition of between 1 and 10% of sulphur is quite sufficient to ensure the production of pellets which are extremely stable.

During the following roasting procedure the sulphur which has been added as a binding agent quickly burns away, and in the case of a large number of substances which are thus to be roasted, especially pure pyrites without a matrix or poor pyrites, the danger that the pellets will disintegrate arises again. In order to prevent this from happening, a further binding agent, in addition to the sulphur, may be usefully added to the initial raw material prior to pelletization. This additional agent need not then be water-resistant and it need not then impart strength to the pellets, but it must take effect during the roasting which follows the pelletizing to improve the strength of the roasted pellets. It has been found that bentonite is suitable for this purpose. Other active earths or activated clays such as fuller's earth and montmorillonite (hydrous aluminum silicate) are also known to the art. The term active earths covers those earths having a large surface area per unit of weight and they are used for various purposes requiring great surface activity. Instead of making separate additions of sulphur and bentonite, substances may also be used which contain both elemental sulphur and a heat-resistant binding agent, such as exhausted iron hydroxide gas purification masses, that is, gas purification compounds which have been used for the elimination of sulphur from gases such as illuminating gas, natural gas, converter gas, etc., sulphur earths which are natural minerals containing sulphur in the elemental state, and so forth.

If the initial raw material contains moisture, it is advisable to add the necessary binding agents to it while the raw material is still moist and thereafter to pelletize the mixture. If the initial raw material is dry, it is moistened either before or after making the necessary admixture with the binding agents, but preferably during the admixture of the binding agents. Alternatively, moistening may also take place during pelletization. Pelletization may be performed in any desired manner, for example, by granulating in a drum or on an inclined granulation disc. The resultant green pellets are dried in a conventional manner and then briefly heated to temperatures above 120° C. The sulphur employed for this purpose need not satisfy any special requirements, and any grade of sulphur, but especially sulphur rich in ash and bitumen, may be readily used.

The invention will be illustrated by the following examples:

EXAMPLE 1

*Pelletization With the Sole Addition of Elemental Sulphur*

A pyrite of the following composition was used for this test:

| | Percent |
|---|---|
| Total S | 48 |
| Total Fe | 42.1 |
| $SiO_2$ | 4.7 |
| $Al_2O_3$ | 1.7 |
| Zn | 0.6 |

The screen analysis was as follows:

| | Percent |
|---|---|
| Larger than 0.2 mm | 4.5 |
| 0.09–0.2 mm | 8.5 |
| 0.06–0.09 mm | 19.0 |
| Under 0.06 mm | 73.0 |

An addition was made to this flotation pyrite of 3% of a bituminiferous waste sulphur containing 96.3% sulphur, which had first been wet ground to a grain size of 100% under 0.2 mm. and then centrifugally dried until the residual water content was 5%. After inmixing the sulphur with the pyrite in an Eirich mixer, the mixture was pelletized on a granulating disc while being sprayed with water, and green pellets were produced of a diameter between 2 and 5 mm. with a moisture content of 8.7%. The pellets were dried for three hours in an electrical drying oven at 70° C. and then heated to 135° C., at which temperature they were maintained for three hours before being allowed to cool down to room temperature.

The 3 to 4 mm. fraction of the pellets thus obtained was screened out for the purpose of determining compressional strength. After having been dried at 70° C., but before being heated to 135° C., the compressional strength of a pellet averaged 0.69 kg., as based upon tests performed on ten individual pellets. After having been heated to 135° C., the average strength of each pellet rose to 2.9 kg.

These green pellets retained their external shape and dimensions after being soaked in water for ten days, whereas pellets similarly produced without the addition of sulphur disintegrated during the course of this water immersion treatment.

The roasting stability of the resultant pellets was determined by thoroughly roasting them for four hours at 800° C. in a test muffle furnace while occasionally stirring them and blowing air through them. The screen analysis of the roasted pellets was:

| | Percent |
|---|---|
| 3–4 mm | 43.5 |
| 1–3 mm | 16.8 |
| 0.5–1 mm | 4.1 |
| 0.4–0.5 mm | 1.1 |
| 0.3–0.4 mm | 1.3 |
| 0.2–0.3 mm | 1.3 |
| 0.1–0.2 mm | 5.9 |
| 0.075–0.1 mm | 7.3 ⎫ |
| 0.06–0.075 mm | 5.1 ⎬ 26.0 |
| Smaller than 0.06 mm | 13.6 ⎭ |

The screen analysis shows that the portion under 0.1 mm., which is a measure for the strength of the pellet, is 26.0%.

The compression strength of the roasted pellets was on the average 0.92 kg. per pellet.

EXAMPLE 2

*Pelletization With the Sole Addition of 10% of Elemental Sulphur*

A pyrite of the following composition was used for this text:

| | Percent |
|---|---|
| Fe | 35.5 |
| $SiO_2$ | 11.1 |
| $Al_2O_3$ | 2.6 |
| Zn | 0.8 |
| S | 41.0 |

The grain size was below 0.1 mm. This material was mixed with 10% by weight of flowers of sulphur. The mixture was pelletized on a granulating disc while being sprayed with water, and green pellets were produced of a diameter of 2 up to 4 mm. with a moisture content of about 9%. The pellets were dried and heated in the same manner as shown in Example 1. After cooling down to room temperature they showed a compressional strength of 4.1 kg. These pellets were stored in the open air for six months after which time no losses of strength occurred.

After this storage in the open air the pellets were roasted at 800° C. in a test muffle furnace. The screen analysis of the roasted pellets was:

| | Percent |
|---|---|
| 3–4 mm | 49.0 |
| 1–3 mm | 20.4 |
| 0.5–1 mm | 6.3 |
| 0.1–0.5 mm | 10.6 |
| Smaller than 0.1 mm | 13.7 |

EXAMPLE 3

*Pelletization With the Simultaneous Use of Bentonite and Elemental Sulphur as Binding Agents*

The same flotation pyrite as used in Example 1 was pelletized with the addition of the same quantity and composition of waste sulphur as used according to Example 1 to serve as a binding agent, but 1% of dry bentonite having a grain size of 100% under 0.2 mm. was immixed at the same time as the 3% of the ground sulphur was added. The green pellets were treated and cooled in the same way as described in Example 1. The compression strength of the green pellets after being dried at 70° C., but prior to being heated to 135° C., averaged 2.1 kg. per pellet. These finished pellets underwent the ten days' immersion test in water without suffering damage.

The resultant pellets were then thoroughly roasted to test their roasting stability in the same manner as in Example 1, that is at 800° C. for four hours. The screen analysis of these roasted pellets was as follows:

| | Percent |
|---|---|
| 3–4 mm | 64.0 |
| 1–3 mm | 23.2 |
| 0.5–1 mm | 1.1 |
| 0.4–0.5 mm | 0.3 |
| 0.3–0.4 mm | 0.3 |
| 0.2–0.3 mm | 0.4 |
| 0.1–0.2 mm | 1.6 |
| 0.075–0.1 mm | 2.4 ⎫ |
| 0.06–0.075 mm | 1.8 ⎬ 9.1 |
| Smaller than 0.06 mm | 4.9 ⎭ |

It will be seen that the portion under 0.1 mm. in this case is only 9.1% so that the roasted pellets made from green pellets containing both sulphur and bentonite were qualitatively very much better than those obtained in the foregoing examples. The compressional strength of the roasted pellets averaged 5 kg. per pellet.

EXAMPLE 4

*Pelletizing With the Simultaneous Use of 1% Elemental Sulphur and 1% Bentonite*

Pyrite of the same analysis and grain size as used in Example 1 was mixed with 1% flowers of sulfur and 1% bentonite in an Eirich mixer and pelletized on a granulating disc. Green pellets were produced of a diameter of 2 mm. up to 4 mm. with a moisture content of 9%. These green pellets were dried in an electrical oven at 70° and then treated to 135° C. as described in the foregoing examples. After cooling down to room temperature the dried and burned pellets showed a compressional strength of about 1.31 kg.

After storage in the open air for six months the pellets were roasted as described in the foregoing examples at 800° C. The screen analysis of the roasted pellets was:

| | Percent |
|---|---|
| 3–4 mm | 83.2 |
| 1–3 mm | 9.8 |
| 0.5–1 mm | 0.5 |
| 0.1–0.5 mm | 1.0 |
| Smaller than 0.1 mm | 5.5 |

EXAMPLE 5

*Pelletizing of Zinc Blende With Addition of Sulfur and Bentonite*

Huanchaca-zinc blende was mixed with 1% bentonite and 3% flowers of sulfur, and pelletized as described in the foregoing examples. The green pellets were dried while being suspended in air of 90° C. After drying the pellets were reated to 135° C. and kept at this temperature for 15 minutes. After cooling down to room temperature the compressional strength of the pellets was 3.8 kg.

After storage in the open air for six months the pellets were roasted in a fluidized state in a test furnace at 960° C. The roasted pellets contained 1.25% of sulphur. The following table shows the diameters of the pellets before and after roasting.

HUANCHACA-BLENDE

| Mm. | Smaller than 0.06 | 0.06–0.25 | 0.25–0.50 | 0.50–1.0 | 1.0–2.0 | 2.0–4.0 |
|---|---|---|---|---|---|---|
| Before roasting, percent | 0 | 0.2 | 1.6 | 6.6 | 57.2 | 34.4 |
| After roasting, percent | 0.2 | 1.6 | 4.0 | 8.2 | 49.2 | 36.8 |

EXAMPLE 6

*Pelletizing of Pyrite With Addition of Sulphur Earth*

Pyrite of the same analysis as in Example 1 was mixed with 5% of pulverized sulphur earth which contained 50% sulphur and a siliceous gangue and then pelletized on a granulating disc while being sprayed with water. The green pellets of a diameter of 2 mm. up to 4 mm. were dried at 70° C. and then heated to 135° C. as described in Example 1. After cooling down to room temperature they had a compressional strength of 2.8 kg. There was no loss of strength after a 3 months' storage in the open air. After roasting the stored pellets in a test muffle furnace at 800° C. they showed the following screen analysis:

| | Percent |
|---|---|
| 3–4 mm | 54.3 |
| 1–3 mm | 18.6 |
| 0.5–1 mm | 8.0 |
| 0.1–0.5 mm | 11.4 |
| Smaller than 0.1 mm | 7.7 |

Having now described the means by which the objects of the invention are obtained, we claim:

1. A method of producing weather-resistant pellets of fine-grained metallurgical raw materials comprising admixing said raw materials with a water-resistant binding agent selected from the group consisting of elemental sulphur, and substances containing a major portion of elemental sulphur, pelletizing said admixture, drying said pellets at a temperature below that of the melting point of sulphur, heating said pellets to a temperature above that of the melting point of sulphur, and then cooling said pellets.

2. A method as in claim 1 further comprising a finely ground heat resistant binding agent composed of an active earth admixed with said raw metallurgical materials.

3. A method as in claim 2 in which said active earth is bentonite.

4. A method as in claim 2 in which said water-resistant binding agent and said heat-resistant binding agent are selected from the group consisting of an exhausted iron hydroxide gas purification mass and a sulphur earth.

5. A weather-resistant pellet of metallurgical materials containing a heat hardened water-resistant binding agent selected from the group consisting of elemental sulphur and substances containing a major portion of elemental sulphur.

6. A weather resistant pellet as in claim 5 in which said active earth is bentonite.

7. A weather-resistant pellet of metallurgical materials containing a heat hardened water-resistant binding agent selected from the group consisting of elemental sulphur and substances containing a major portion of elemental sulphur, and an active earth as a heat resistant binding agent.

References Cited in the file of this patent

UNITED STATES PATENTS

| 1,013,614 | Robeson | Jan. 2, 1912 |
| 1,158,365 | Bibb | Oct. 26, 1915 |
| 1,158,366 | Bibb | Oct. 26, 1915 |
| 2,582,386 | Komarek et al. | Jan. 15, 1952 |
| 2,711,951 | West et al. | June 28, 1955 |
| 2,834,660 | Eisenhut et al. | May 13, 1958 |

FOREIGN PATENTS

| 1,125 | Great Britain | 1875 |

OTHER REFERENCES

Abraham: Asphalts and Allied Substances, vol. 1, Fifth Edition, 1945, D. Van Nostrand Company, Inc., New York. (Pages 156, 192, 194, 201, and 202 relied on.)